United States Patent [19]

Gerber

[11] 4,091,980
[45] May 30, 1978

[54] APPARATUS FOR ADVANCING SHEET MATERIAL

[75] Inventor: Heinz Joseph Gerber, West Hartford, Conn.

[73] Assignee: Gerber Scientific Instrument Company, South Windsor, Conn.

[21] Appl. No.: 797,000

[22] Filed: May 16, 1977

[51] Int. Cl.² .......................................... B65H 17/36
[52] U.S. Cl. ............................ 226/162; 101/382 MV; 346/136
[58] Field of Search ............... 226/59, 60, 147–151, 226/158, 162–167, 200; 101/382 MV; 346/136

[56] References Cited

U.S. PATENT DOCUMENTS

| 2,686,050 | 8/1954 | De Zelar | 226/158 |
| 3,844,461 | 10/1974 | Robison | 226/162 X |

Primary Examiner—Richard A. Schacher
Attorney, Agent, or Firm—McCormick, Paulding & Huber

[57] ABSTRACT

A plotting apparatus has an automatically controlled carriage assembly for precisely controlling movement of a plotting instrument relative to an associated section of an elongated strip of plotting paper supported on a table which has a stationary low-friction work surface. A coupling mechanism mounted on the carriage assembly includes a friction shoe movable into frictional gripping engagement with the plotting paper to releasably couple the paper to the carriage to move with it and in sliding engagement with the stationary work surface whereby another section of the plotting paper may be moved into plotting position on the work surface when the plotting instrument is not operating.

8 Claims, 6 Drawing Figures

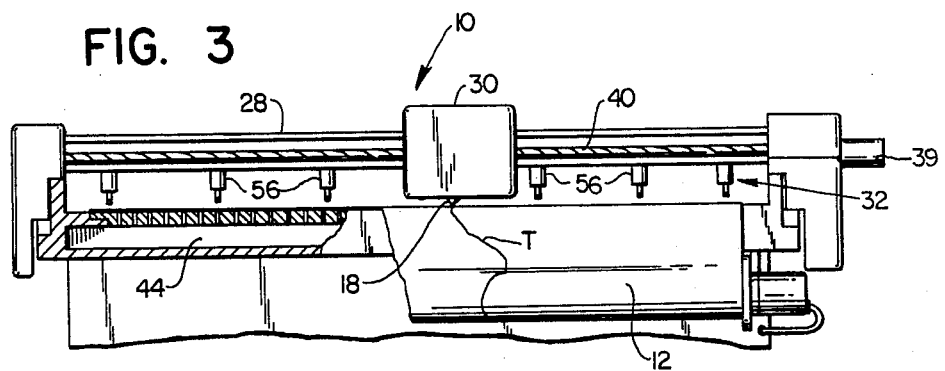
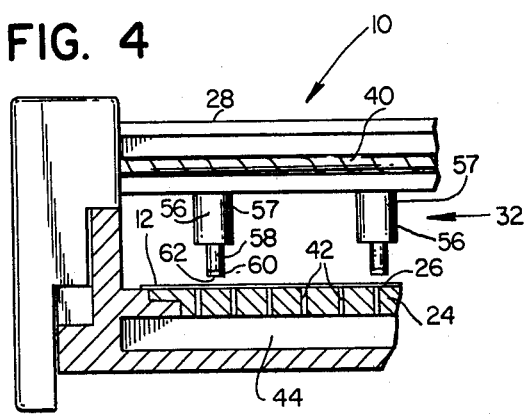
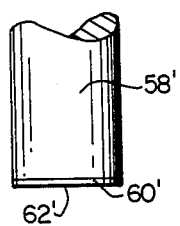
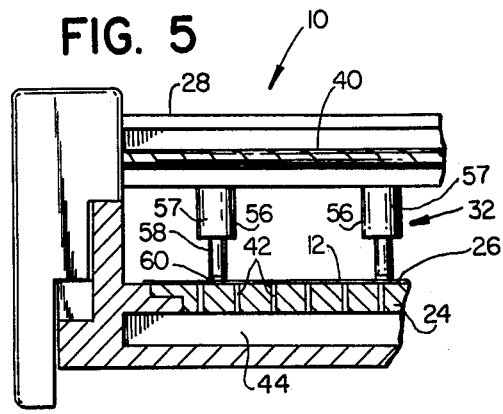

APPARATUS FOR ADVANCING SHEET MATERIAL

BACKGROUND OF THE INVENTION

This invention relates in general to apparatus for advancing a strip of sheet material over the work surface of a table by precisely controlled amounts and deals more particularly with an improved apparatus of the type wherein a carriage used to position an instrument over the work surface is also employed to advance or shift the strip of sheet material relative to the work surface when the instrument is not in operation.

A typical automatically controlled instrument system of the type with which the present invention is concerned has carriages which move in two coordinate directions over the work surface of a table. Typically, a first carriage traverses the table in one coordinate direction parallel to the work surface and a second carriage mounted on the first moves relative to the first and in another coordinate direction. When an instrument is mounted on the second carriage composite movements of both carriages allow the instrument to be translated to any point over the region of the work surface traversed by the carriages. Accurate positioning of the carriages and the instrument carried thereby may be achieved by numerical controls which may operate either from an on-line data generator or from previously programmed data. Such machines may be provided with a wide variety of instruments, as, for example, plotting pens or styluses, light heads, tracking heads and cutting or drilling tools. In a machine of this type, a strip of sheet material which is substantially longer than the machine table can be handled by providing means for accurately advancing or indexing the sheet material over the table surface so that the instrument may operate on successive sections of the material.

The difficulty in working on successive sections of a strip of material is that movement of each section of the strip into working position must be precisely controlled to permit generation of continuous patterns which extend between adjacent sections of the strip. In a high resolution plotting system, for example, a series of plotted lines may extend continuously over several successive sections of a strip which is substantially longer than the plotting table. The strip indexing operation, unless accurately controlled, may cause discontinuity in the plot resulting in plotted lines on adjacent sections being out of registration. This problem has been overcome by providing apparatus which includes means for releasably coupling sheet material to the instrument carriage so that the sheet material may be moved relative to the work surface on which it is supported with the same degree of accuracy attained in moving the instrument. Such apparatus is illustrated and described in U.S. Pat. No. 3,844,461 to Samuel Clifford Robison et al for PRECISE INDEXING APPARATUS AND METHOD, issued Oct. 29, 1974, and assigned to the assignee of the present application.

The present invention is concerned with improved apparatus of the type shown in the patent to Robison et al and particularly with apparatus which includes improved means for coupling sheet material to a carriage for advancing or indexing movement therewith.

SUMMARY OF THE INVENTION

In accordance with the present invention an automatically controlled instrument system is provided which includes a carriage for precisely controlling movement of an instrument over a stationary work low-friction surface on which a sheet of material is spread. At least one frictional coupling unit is mounted on the carriage for movement therewith and relative to the work surface and includes a friction shoe and means for moving the shoe generally toward and away from an opposing portion of the stationary work surface between coupled and uncoupled positions. In its coupled position the friction shoe is disposed in frictional gripping engagement with the upper surface of a sheet of material spread on the stationary work surface with an associated portion of its lower surface in direct contact with said opposing portion of the work surface. Movement of the carriage causes corresponding movement of the sheet with the carriage and in sliding engagement with the work surface.

BRIEF DESCRIPTION OF THE DRAWINGS

FIG. 3 is a fragmentary end elevational view of the plotting table shown in partial section.

FIG. 4 is a somewhat enlarged fragmentary sectional view taken along the line 4—4 of FIG. 2.

FIG. 5 is similar to FIG. 4, but shows the coupling mechanism in another position.

FIG. 6 is a somewhat enlarged fragmentary elevational view of another coupling unit.

DETAILED DESCRIPTION OF PREFERRED EMBODIMENT

Figure 1:
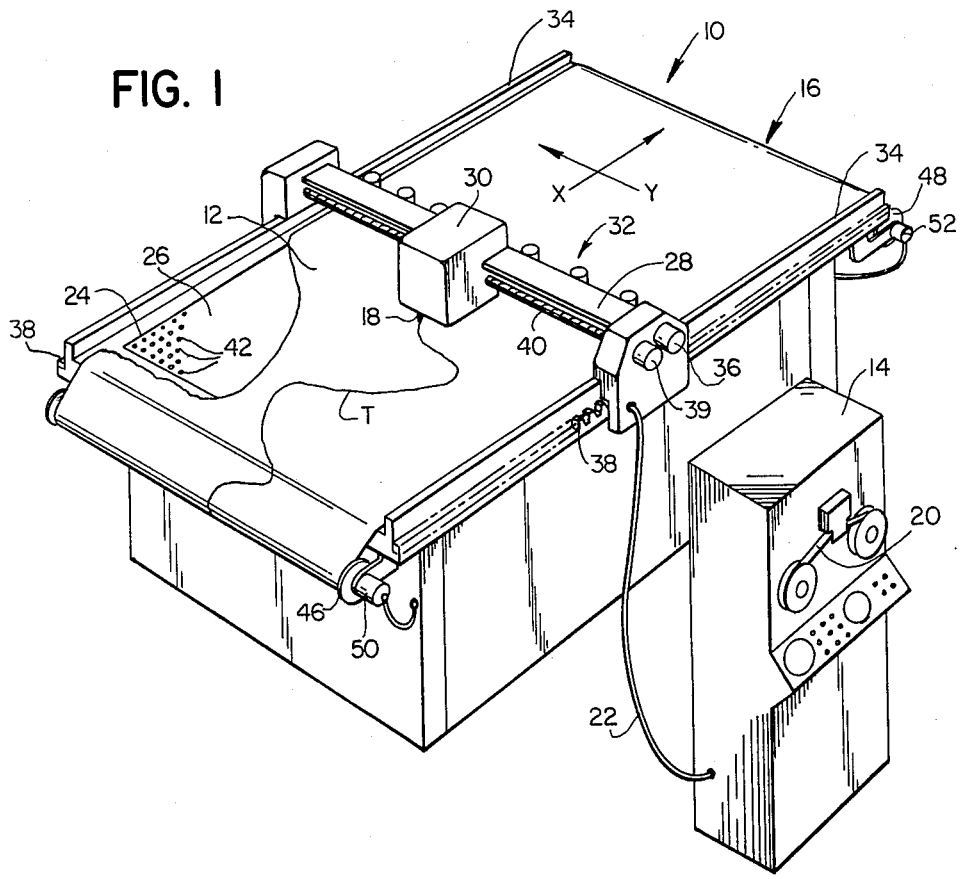
FIG. 1 is a perspective view of an automatically controlled flat bed plotting machine embodying the present invention shown with plotting paper thereon, a portion of the plotting paper being cut away to expose the plotting table bed.

The present invention may be practiced with any automatically controlled system which includes an instrument supported by a carriage for precise positioning over a strip of sheet material which is held in fixed position on a stationary work surface while the instrument operates on the sheet. However, the invention is hereinafter illustrated and described with particular reference to a numerically controlled plotting machine indicated generally at 10, which produces graphical information on a strip of sheet material or plotting paper 12. The plotting system 10 generally comprises a controller 14, which generates plotting commands, and a flat bed plotting table indicated generally at 16, which includes a plotting head or pen 18 responsive to the plotting commands for drawing graphic information on the paper 12. The controller 14 reads a plotting program from a punched or magnetic tape 20 and converts the program into motor command signals which are transmitted to the plotting table 16 through a control cable 22. The plotting table 16 further includes a bed 24 which has a low-friction work surface 26 and a carriage assembly which includes an X-carriage 28 supported for reciprocal movement in the illustrated X-direction relative to the work surface, and a Y-carriage 30 mounted on the X-carriage and movable relative to the work surface 26 in the illustrated Y-direction. Composite motions of the carriages 28 and 30 permit the plotting pen 18 to be translated to any coordinate position relative to the stationary work surface 26 on which the plotting paper 12 is supported.

The plotting machine 10 is particularly adapted to generate a continuous plot or trace T on an elongated strip of sheet material which is considerably longer than the table which supports it. Since the machine 10 is capable of operating on only a limited section of the plotting paper 12, a coupling means is provided for coupling the plotting paper to the carriage to intermittently advance it over the work surface so that the plotting instrument 18 may operate on successive sections of the strip 12 to generate the continuous trace T. In accordance with the present invention, the illustrated plotting machine 10 includes a frictional coupling mechanism, indicated generally at 32 for releasably frictionally coupling the plotting paper 12 to the carriage to move therewith in sliding engagement to the stationary work surface 26 which supports it.

The X-carriage 28 is accurately guided for movement in the X-direction by ways 34, 34 which extend longitudinally along opposite lateral edges of the plotting table. An X-drive motor 36 receives commands from the controller 14 and rotates pinions (not shown) which engage gear racks 38, 38 at opposite sides of the table to accurately translate the X-carriage to various positions relative to the work surface 26.

The Y-carriage 30 is supported on a bridging portion of the X-carriage to move transversely of the table in the Y-direction. A Y-drive motor 39 which receives command signals from the controller 14 rotates the lead screw 40 which extends in the Y-direction and is threadably engaged with the Y-carriage 30 to accurately position it in the Y-direction.

The pen 18 is mounted on a Z-carriage (not shown) which is carried by the Y-carriage 30. The Z-carriage moves the pen 18 into and out of contact with the plotting paper 12 in response to command signals from the controller 14.

Figure 2:
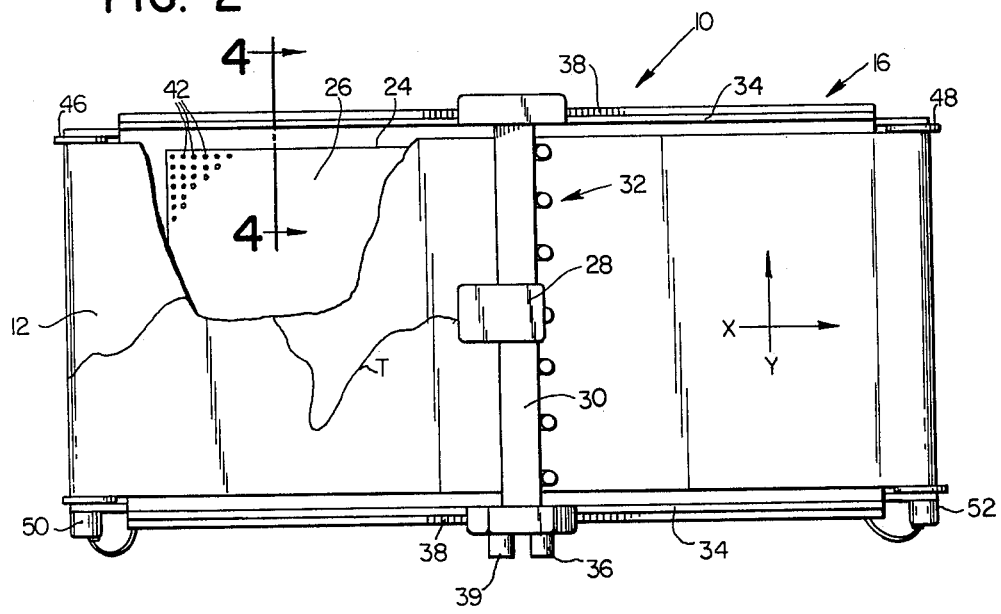
FIG. 2 is a plan view of the plotting table of the machine of FIG. 1.

The bed 24 may be made from any suitable material and defines a low-friction work surface 26 which is preferably smooth, relatively hard and has a low coefficient of friction relative to the sheet material it is adapted to support. Materials such as aluminum, FORMICA, or plastic of a type which has a smooth relatively slippery surface may be used to make the bed and such materials are hereinafter generally described as low friction materials. The bed may also be made from other materials not of low-friction type provided a suitable coating of low-friction material, such as an epoxy, for example, is applied to the bed material to provide the low-friction work surface 26. A plurality of small passageways 42, 42 formed in the bed 24 communicate with a vacuum chamber 44 immediately below the bed 24 and comprise a vacuum hold-down system, as shown in FIGS. 3-5. The passageways 42, 42 open though the work surface 26 in uniformly spaced parallel rows, as best shown in FIGS. 1 and 2. A vacuum pump (not shown) is connected to the chamber 44 to evacuate it whereby the plotting paper 12 may be held in stationary position on the work surface 26 by the vacuum hold down system in a manner well known in the art.

The plotting paper 12 comprises an elongated strip of paper supported on rolls or feed spools 46 and 48 mounted on brackets at opposite longitudinal ends of the plotting table 16. Torque motors 50 and 52 drivingly connected to feed spools 46, and 48, respectively, cooperate to apply tension to the plotting paper 12 to hold a section of the paper in taut position on the work surface 26. The motors 50 and 52 may also be employed to assist the carriage 28 in advancing the strip of plotting paper 12 in the X-direction, as will be hereinafter more fully discussed. Reference may be had to the aforementioned patent to Robison et al for additional disclosure of a plotting machine such as hereinbefore generally described.

Considering now the coupling mechanism 32 in further detail, it comprises at least one frictional coupling unit 56 for releasably frictionally coupling the plotting paper 12 to the carriage assembly. The illustrated plotting apparatus 10 includes a plurality of coupling units 56, 56 which are mounted in transversely spaced series along the X-carriage 24 to travel therewith.

A typical coupling unit 56 includes a drive motor or electrical solenoid 57 which is mounted on the X-carriage 28 and which has a movable part or plunger 58. A friction shoe 60 made from high-friction material, such as rubber, cork or the like, is mounted in fixed position at the lower end of the plunger 58 and has a high-friction surface 62 generally parallel to the work surface 26. The plunger 58 is movable generally toward and away from an opposing portion of the work surface 26 between adjacent rows of opening in the work surface between coupled and uncoupled positions. When the coupling unit 56 is in its coupled position the high-friction surface 62 is disposed in frictional gripping engagement with the upper surface of the plotting paper 12 supported on the work surface, as shown in FIG. 5, the lower surface of the plotting paper being in direct contact with an associated opposing portion of the stationary work surface 26. When the coupling unit 56 is in its uncoupled position the friction shoe is disposed a substantial distance above the work surface 26 so that its high-friction surface 62 is out of frictional engagement with the plotting paper 12.

The materials chosen to define the low-friction work surface of the plotting table and the high-friction surface of the friction shoe will be determined, to some degree, by the nature of the sheet material which the apparatus is to process. However, the table work surface must have a low coefficient of friction relative to the surface of the sheet material which is in contact with it, whereas the friction shoe must have a high coefficient of friction relative to the sheet material surface that it engages.

In FIG. 6 there is shown another embodiment of the invention wherein a coupling unit plunger 58' comprises a metallic part. A relatively thin layer of high-friction material at the free end of the plunger 58' comprises a friction shoe 60' and defines a friction surface 62'. The friction shoe 60' may be formed by a thin sheet of high-friction sheet material adhered to the free end of the plunger 58' or may comprise a coating of high-friction material applied to the free end. The friction surface 62' is relatively inelastic within the range of coupling pressure normally applied to the plunger 58' in the operation of an associated plotting machine. Thus, by properly controlling the pressure of the friction surface 62' on the sheet 12 the friction surface 62' may be brought into frictional engagement with the sheet without incurring significant deformation and without imparting significant deformation to the sheet which might adversely effect accuracy of positioning.

In operation, the carriage assembly moves longitudinally of the plotting table and in FIGS. 1 and 2 the apparatus 10 is shown after the carriage assembly has moved in one direction from the left end toward the right end of the plotting table, in response to positioning signals received from the controller 14, with the pen 18 in contact with the plotting paper 12 to generate a trace T on an associated section of the paper, which is supported on the work surface 26 and held in fixed position thereon by the vacuum hold-down system. When the carriage assembly reaches the limit of its longitudinal travel in the one direction at one end of the plotting table, the Z-carriage operates in response to a signal from the controller 14 to move the pen 18 out of engagement with the plotting paper 12. Another signal from the controller 14 causes the coupling units 32, 32 to move to coupled position whereupon a further signal from the controller causes deenergization of the vacuum hold-down system to release the plotting paper 12 for movement in the opposite longitudinal direction or toward the opposite end of the plotting table with the carriage assembly and relative to the work surface 26. The carriage 28 which is now frictionally coupled to the plotting paper 12 by the various coupling units 32, 32 comprises the prime mover for precisely advancing the plotting paper 12 in the opposite direction and relative to the work surface 26. While the paper 12 is being advanced the torque motors 50 and 52 may be slaved to the carriage 28 by the controller 14. In slaving, one of the torque motors is deenergized and the other torque motor applies slight driving torque in its associated roll and a pulling force to the paper ahead of and simultaneously with and in coordination with the movement of the carriage 28 to take up paper. In the illustrated example the torque motor 50 is energized as the carriage assembly moves toward the left hand end of the plotting table. When the carriage 30 and the paper 30 and the paper strip 12 carried therewith have advanced to the left hand end of the table, as viewed in FIG. 2, the carriage comes to rest momentarily. The vacuum hold-down system is reenergized on signal from the controller 14 to hold a new section of the plotting paper 12 in stationary position on the work surface 26. Further signals from the controller move the frictional coupling units 56, 56 to uncoupled position and cause the Z-carriage to move the plotting pen 18 into engagement with the plotting paper 12 in registry with the trace T whereupon further composite movement of the carriage assembly in response to signals from the controller 14 continues the trace across the new section of the plotting paper 12 in plotting position on the work surface 26.

I claim:

1. In an automatically controlled instrument system having a carriage for controlling precise movement of an instrument over a table on which a sheet of material is spread and including means for releasably coupling the sheet of material to the carriage for movement therewith and relative to the table to alter the position of the sheet of material on the table, the improvement comprising said table having a stationary low-friction work surface for supporting a sheet of material spread thereon and said coupling means including at least one frictional coupling unit mounted on said carriage for movement therewith relative to said stationary low-friction surface, said one frictional coupling unit including a friction shoe having a high-friction surface and means for moving said friction shoe generally toward and away from an opposing portion of said low-friction surface between a coupled position wherein said high friction surface is in frictionally gripping engagement with the upper surface of a sheet of material spread on the table with an associated portion of its lower surface in direct contact engagement with said opposing portion of said stationary low friction work surface and an uncoupled position wherein said high friction surface is out of frictional gripping engagement with the upper surface of the sheet of material spread on the table.

2. In an automatically controlled instrument system as set forth in claim 1 the further improvement wherein said stationary low-friction work surface has openings therethrough and said opposing portion of said low-friction surface is disposed between said openings.

3. An automatically controlled instrument system as set forth in claim 1 wherein said coupling means comprises a plurality of frictional coupling units mounted in series along said carriage.

4. In an automatically controlled instrument system as set forth in claim 1 the further improvement wherein said one frictional coupling unit comprises a motor mounted in fixed position on said carriage and having a movable plunger and said friction shoe is disposed on a free end of said plunger.

5. In an automatically controlled instrument system as set forth in claim 4 the further improvement wherein said motor comprises an electrical solenoid.

6. In an automatically controlled instrument system as set forth in claim 4 the further improvement wherein said friction shoe comprises a relatively thin sheet of low-friction material adhered to said free end.

7. In an automatically controlled instrument system as set forth in claim 4 wherein said friction shoe comprises a coating of low-friction material on said free end.

8. In an automatically controlled instrument system having a carriage for controlling precise movement of an instrument over a table on which a sheet of material is spread and including means for releasably coupling the sheet of material to the carriage for movement therewith and relative to the table to alter the position of the sheet of material on the table, the improvement comprising said table including a stationary work surface having a low coefficient of friction relative to the sheet of material spread thereon with one surface in direct contact with said stationary work surface and said coupling means comprises a coupling unit mounted on said carriage and having a friction shoe and means for moving said friction shoe generally toward and away from an opposing portion of said stationary work surface between a coupled position wherein said friction shoe is in frictional gripping engagement with another surface of said sheet material opposite said one surface and an uncoupled position wherein said friction shoe is out of frictional gripping engagement with said other surface and wherein said friction shoe has a high coefficient of friction relative to said other surface.

* * * * *